(12) United States Patent  
Irie

(10) Patent No.: US 8,643,555 B2
(45) Date of Patent: Feb. 4, 2014

(54) WIRELESS COMMUNICATION DEVICE

(75) Inventor: Michio Irie, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 13/295,367

(22) Filed: Nov. 14, 2011

(65) Prior Publication Data

US 2012/0119962 A1    May 17, 2012

(30) Foreign Application Priority Data

Nov. 16, 2010   (JP) .................................. 2010-255596

(51) Int. Cl.
*H01Q 1/12* (2006.01)
(52) U.S. Cl.
USPC ............................. 343/718; 343/720; 343/702
(58) Field of Classification Search
USPC .......................................... 343/718, 720, 702
See application file for complete search history.

(56) References Cited

U.S. PATENT DOCUMENTS

| 5,280,646 | A | * | 1/1994 | Koyama et al. | ............... | 455/300 |
| 5,450,091 | A | * | 9/1995 | Hama | ............... | 343/718 |
| 6,642,895 | B2 | * | 11/2003 | Zurcher et al. | ............... | 343/718 |
| 2007/0285273 | A1 | | 12/2007 | Kobayashi | | |

FOREIGN PATENT DOCUMENTS

| JP | 2007-274609 A | 10/2007 |
| JP | 2011-250233 A | 12/2011 |
| JP | 2012-039487 A | 2/2012 |
| JP | 2012-178645 A | 9/2012 |

* cited by examiner

*Primary Examiner* — Dieu H Duong
(74) *Attorney, Agent, or Firm* — Global IP Counselors, LLP

(57) ABSTRACT

The invention includes a first circuit board on which a plurality of first terminal sections is arranged, a high-frequency circuit arranged on the first circuit board and connected to at least one of the plurality of first terminal sections, a second circuit board on which is arranged a plurality of second terminal sections facing the plurality of first terminal sections, a first internal circuit arranged on the second circuit board and connected to at least one of the plurality of second terminal sections, and electrical continuity unit providing electrical continuity among the plurality of first terminal sections and the plurality of second terminal sections. At least two contiguous terminals of the plurality of first terminal sections and/or the plurality of second terminal sections including a terminal connected to the high-frequency circuit are connected via a capacitor and function as an antenna for wireless communication.

9 Claims, 13 Drawing Sheets

WIRELESS COMMUNICATION DEVICE

CROSS-REFERENCE TO RELATED APPLICATIONS

This application claims priority to Japanese Patent Application No. 2010-255596 filed on Nov. 16, 2010. The entire disclosure of Japanese Patent Application No. 2010-255596 is hereby incorporated herein by reference.

BACKGROUND

1. Technological Field

The present invention relates to a wireless communication device.

2. Background Technology

Wireless communication devices have become progressively smaller in size in recent years, to the point where wristwatch-type devices are now available. While high-density mounting is essential for the purpose of size and weight reduction, antenna construction is crucial for improving receiving sensitivity in extreme reception environments. For example, a construction for arranging an antenna of a compact wireless communication device has been shown (see, for example, Patent Citation 1).

Japanese Patent Application Publication No. 2007-274609 (Patent Citation 1) is an example of the related art.

SUMMARY

Problems to be Solved by the Invention

However, the construction of Patent Citation 1 requires an antenna element such as a chip antenna or the like, and moreover requires means for connecting the antenna and a high-frequency circuit, posing a risk of difficulty in reducing size, weight, and cost.

Means Used to Solve the Above-Mentioned Problems

The present invention is directed to addressing the aforementioned problem at least in part, with realization possible according to the following modes.

First Mode

A wireless communication device including: a first circuit board on which a plurality of first terminal sections is arranged; a high-frequency circuit arranged on the first circuit board and connected to at least one of the plurality of first terminal sections; a second circuit board on which is arranged a plurality of second terminal sections facing the plurality of first terminal sections; a first internal circuit arranged on the second circuit board and connected to at least one of the plurality of second terminal sections; and electrical continuity unit providing electrical continuity among the plurality of first terminal sections and the plurality of second terminal sections; wherein at least two contiguous terminals from among the plurality of first terminal sections and/or the plurality of second terminal sections including a terminal that is connected to the high-frequency circuit are connected via a capacitor; and the two contiguous terminals connected via the capacitor function as an antenna for wireless communication.

According to this mode, in a compact wireless communication device, at least two contiguous terminals from among the plurality of first terminal sections and/or the plurality of second terminal sections connected with electrical continuity unit is used for an antenna, obviating the need for an antenna element such as a chip antenna, and obviating the need for antenna connection unit, and making possible an instrument having smaller size and weight, and lower cost.

Second Mode

The aforedescribed wireless communication device, wherein at least part of the electrical continuity unit functions as an antenna for wireless communication.

According to this mode, the electrical continuity unit is typically arranged in an outside peripheral section of the first circuit board. This position is close to free space and away from ICs such as the CPU, which is a source of noise. Consequently, where used to function as an antenna, antenna performance can be improved further.

Third Mode

The aforedescribed wireless communication device, wherein the plurality of first terminal sections is arranged in outside peripheral sections of the first circuit board.

According to this mode, by selecting a high-performance antenna configuration, transmission efficiency and receiving sensitivity of the high-frequency circuit can be improved.

Fourth Mode

The aforedescribed wireless communication device, wherein the antenna is a dipole antenna.

According to this mode, the high-performance antenna element affords improved transmission efficiency and receiving sensitivity of the high-frequency circuit. With a monopole antenna, GND of large surface area is necessary to attain such performance, and this is difficult to adequately ensure in a compact wireless communication device such as one of wristwatch type. A dipole antenna, on the other hand, substantially requires no GND, and is therefore suited for a compact wireless communication device such as one of wristwatch type.

Fifth Mode

The aforedescribed wireless communication device, wherein the antenna is a diversity antenna.

According to this mode, an antenna element with good reception status can be selected to thereby serve as a high-performance antenna element affording improved transmission efficiency and receiving sensitivity of the high-frequency circuit.

Sixth Mode

The aforedescribed wireless communication device, wherein the wireless communication device includes a second internal circuit arranged on the first circuit board, connected to at least one of the plurality of first terminal sections, and adapted to output a direct current signal or a low-frequency signal; and further includes first high-frequency cutoff elements connected at a first end to the second terminal sections and at another end to the first internal circuit; and/or second high-frequency cutoff elements connected at a first end to the first terminal sections and at another end to the second internal circuit.

According to this mode, the high-frequency circuit and the antenna function are connected via the second terminal sections on the face of the second circuit board which is connected to the first internal circuit via the first high-frequency cutoff element, thereby providing frequency separation between the direct current signal or low-frequency signal of the signal input to the first internal circuit, and the high-frequency signal used in the high-frequency circuit. Also, because the high-frequency circuit and the antenna function are connected via the first terminal sections on the face of the first circuit board which is connected to the second internal circuit via the second high-frequency cutoff element, frequency separation is provided between the direct current signal or low-frequency signal of the signal input to the second internal circuit, and the high-frequency signal used in the high-frequency circuit.

Seventh Mode

The aforedescribed wireless communication device, wherein the first and second high-frequency cutoff elements are inductance elements.

According to this mode, the inductance elements have the action of low-pass filters. Specifically, the elements provide high impedance in relation to frequency components of a high-frequency signal, and low impedance in relation to frequency components of a direct current signal or low-frequency signal; therefore, it is possible to prevent the high-frequency signal leakage to the first and second internal circuits, and it is possible to pass the direct current signal or low-frequency signal applied to the first and second terminal sections to the first and second internal circuits.

Eighth Mode

The aforedescribed wireless communication device, wherein the first and second high-frequency cutoff elements are resistance elements.

According to this mode, the resistance elements have the function of cutting off high-frequency signals (large current magnitude). Also, because the current flowing to the first and second internal circuits is very small, moderate resistance values can be permitted, and therefore the direct current signal or low-frequency signal applied to the first and second terminal sections can be caused to flow to the first and second internal circuits.

Ninth Mode

The aforedescribed wireless communication device, wherein the first internal circuit is a display section, and the second internal circuit is a digital IC for signal processing.

According to this mode, information inside the wireless communication device can be visually confirmed and digitally signal-processed.

BRIEF DESCRIPTION OF THE DRAWINGS

Referring now to the attached drawings which form a part of this original disclosure.

DETAILED DESCRIPTION OF EXEMPLARY EMBODIMENTS

Based on the drawings, a wrist-worn wireless communication device is described below by way of a wireless communication device according to the present embodiment.

First Embodiment

Figure 1:
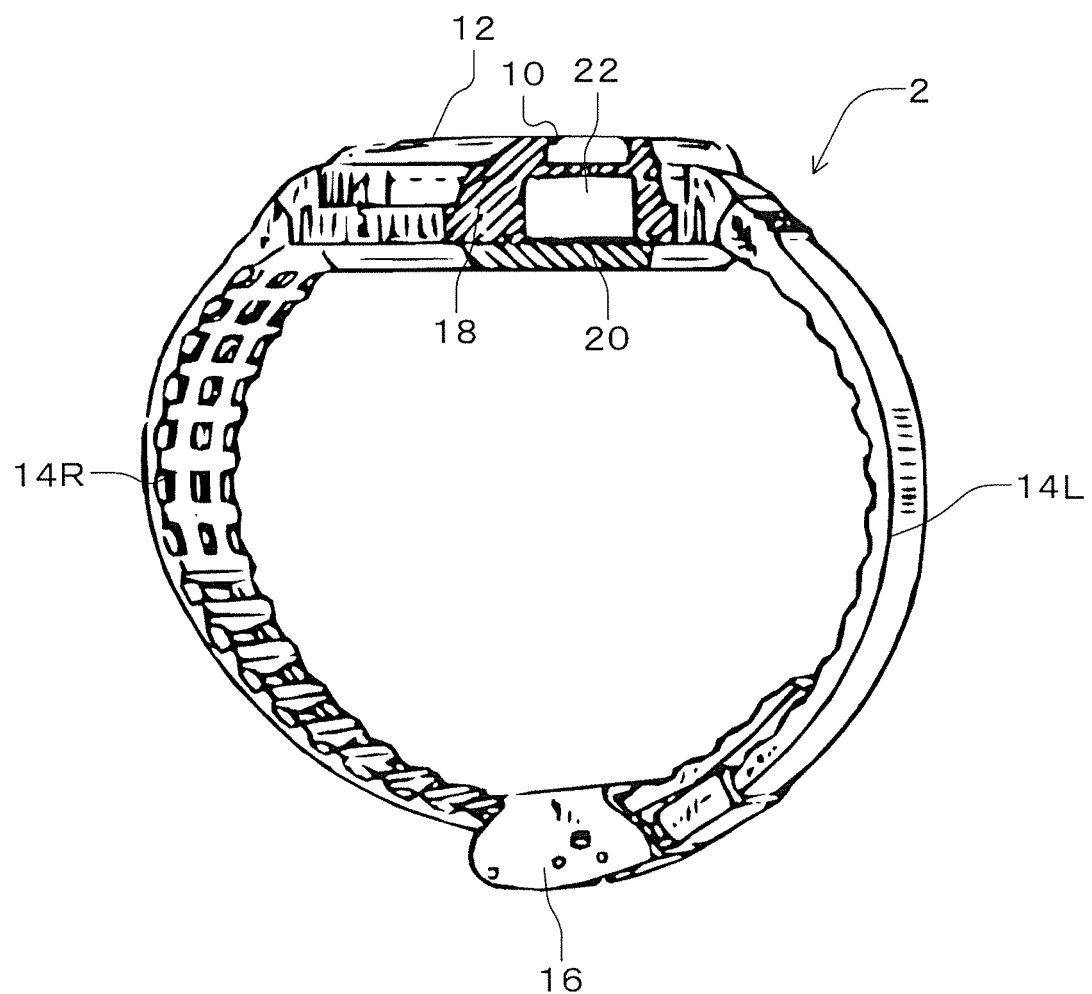
FIG. 1 is a descriptive diagram showing an overall configuration of a wrist-worn wireless communication device according to a first embodiment.
Figure 2A:
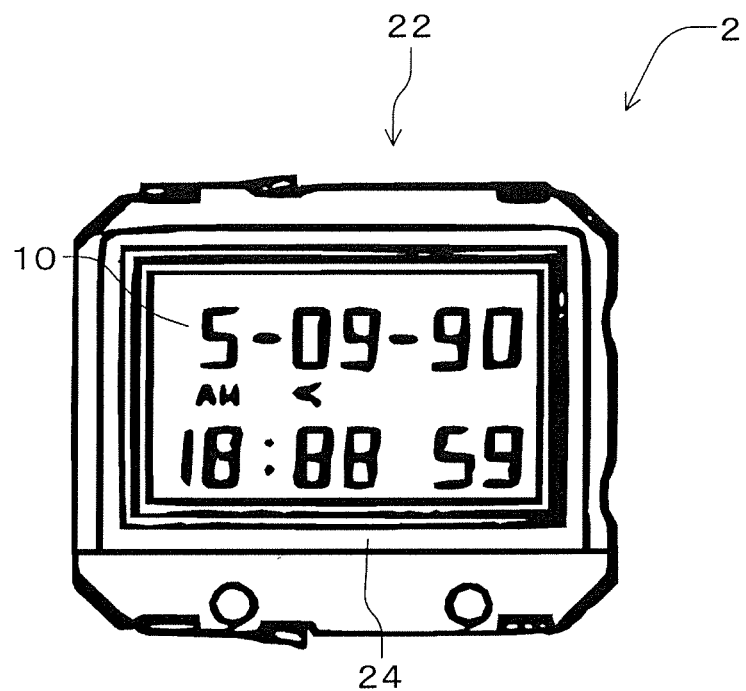
FIG. 2 is a front view and a bottom view showing a circuit assembly on board the wrist-worn wireless communication device according to the first embodiment.
Figure 2B:
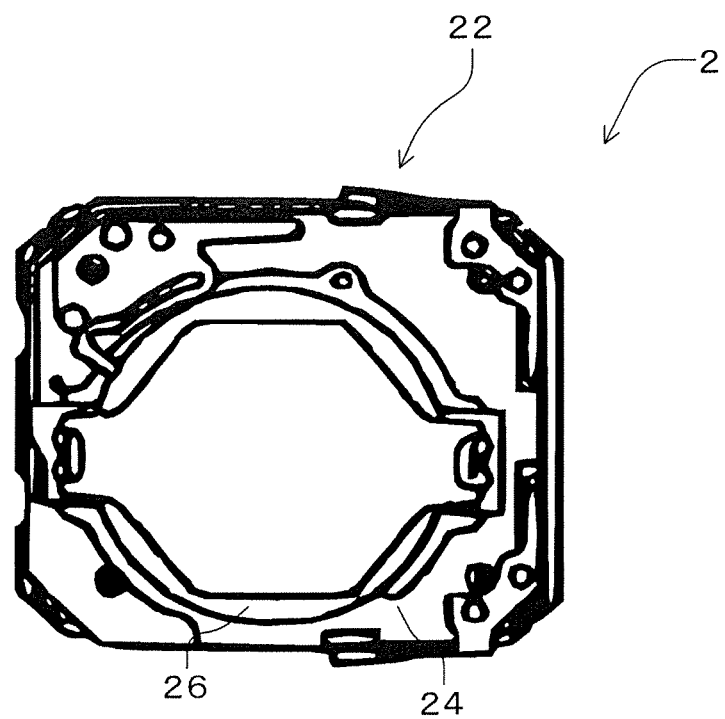

FIG. 1 is a descriptive diagram showing an overall configuration of a wrist-worn wireless communication device according to the present embodiment. FIG. 2 is a front view and a bottom view showing a circuit assembly on board the wrist-worn wireless communication device according to the present embodiment.

The wrist-worn wireless communication device 2 according to the present embodiment comprises a device main body 12, the side at which a liquid crystal panel (display section) (first internal circuit) 10 is disposed being considered the front side; and a pair of wrist bands 14R, 14L. The respective wrist bands 14R, 14L are attached at the basal end of each band to either end of the device main body 12, and it is possible for the bands to be joined to one another at their distal end sections by a buckle 16.

The device main body 12 comprises a front side casing 18, and a back cover 20 affixed to the back side of the casing 18 at the back side of the device main body 12. The device main body 12, which comprises the casing 18 and the back cover 20, houses a circuit assembly 22. The circuit assembly 22 has a construction in which the principal constituent components thereof are disposed in a stack in the thickness direction thereof inside the device main body 12. Specifically, as shown in FIG. 2, the circuit assembly 22 includes the liquid crystal panel 10, a circuit board (first circuit board 24), and a circuit driving cell 26 disposed in the thickness direction.

Figure 3:
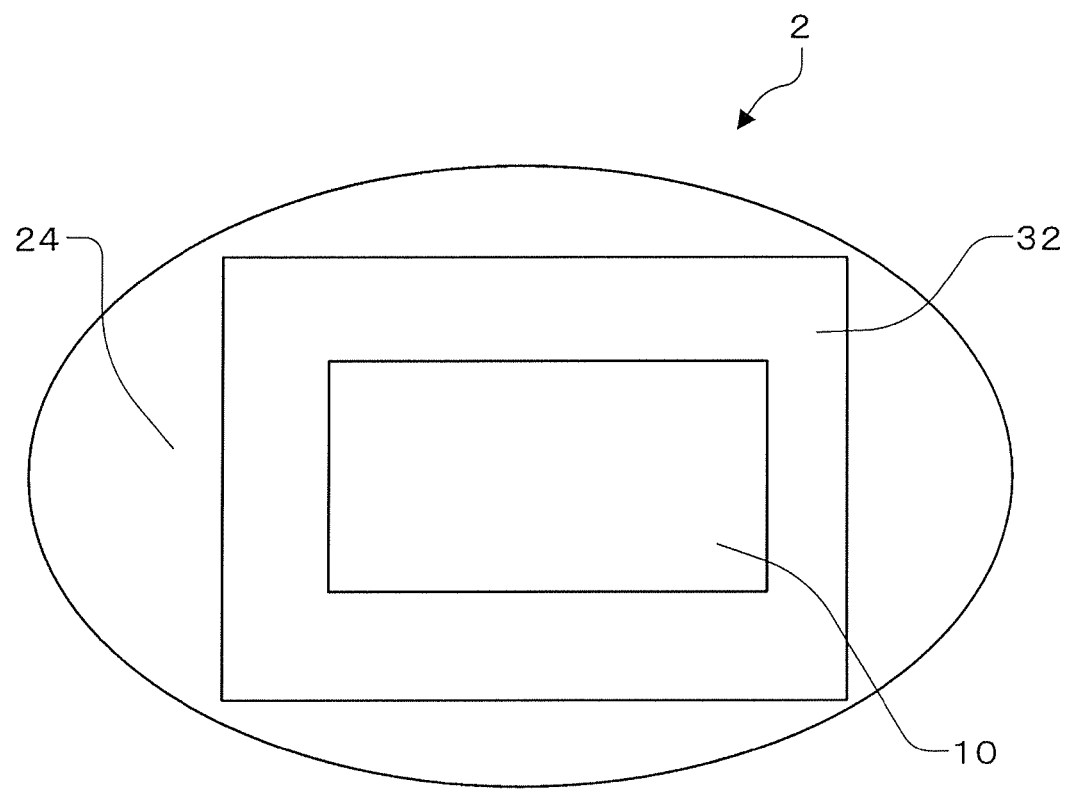
FIG. 3 is a top view of the wrist-worn wireless communication device according to the first embodiment.

FIG. 3 is a top view of the wrist-worn wireless communication device 2 according to the present embodiment. The wrist-worn wireless communication device 2 is provided with the circuit board 24 and with a display panel board (second circuit board) 32. On the circuit board 24 are disposed various integrated circuits (ICs; discussed later), and circuit-board-side terminals. A multilayer board is used as the circuit board 24, with a surface layer pattern (wiring pattern) formed on a board composed of a glass-epoxy board, a phenolic resin board, or a ceramic board.

On the display panel board 32 are disposed the liquid crystal panel 10, and display panel-side terminals, discussed later.

Typically, the circuit-board-side terminals on the circuit board 24 and the display panel-side terminals on the display panel board 32 are connected by "a rubber connector of alternating stacked layers of conductive silicone rubber using metal particles as the conductor, and electrically insulating silicone rubber, in a zebra arrangement" (commonly known as a zebra, and herein referred to as a zebra connector (electrical continuity unit). Here, because the signals supplied to the liquid crystal panel 10 are either direct current signals or low-frequency signals (1 MHz or below), frequency separation from the high-frequency signals currently used in ordinary wireless communications, for example, 2.4 GHz can be provided.

Figure 4:
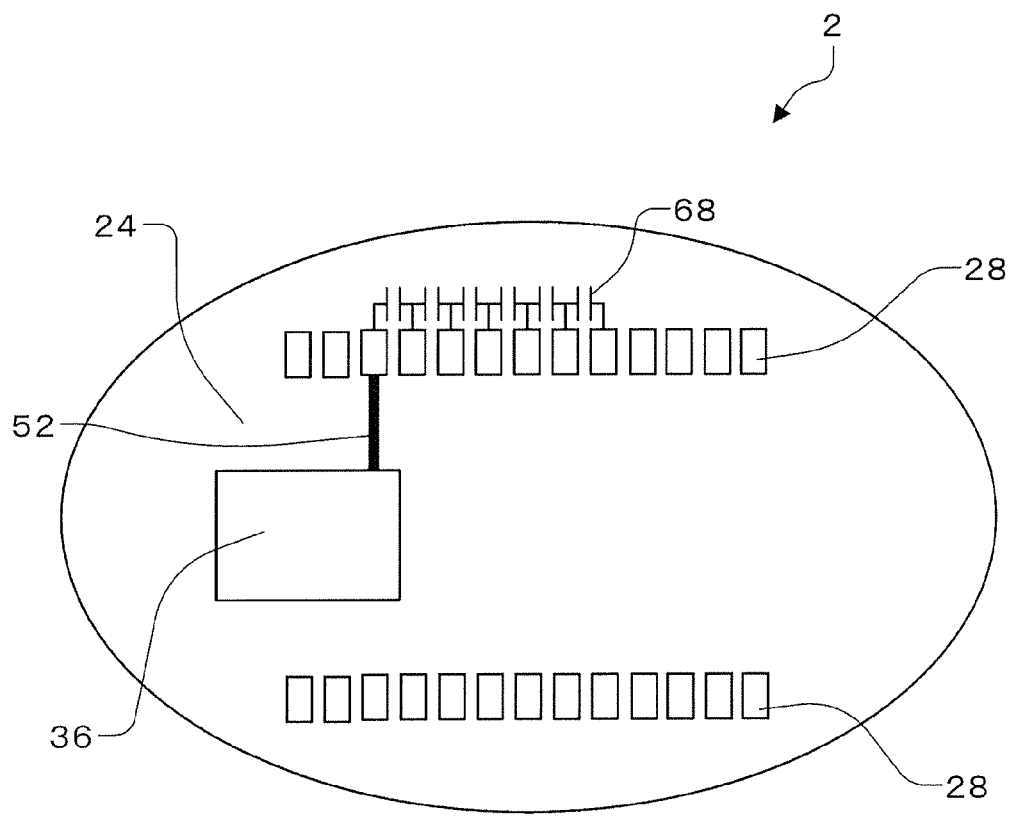
FIG. 4 is a top view of the wrist-worn wireless communication device according to the first embodiment.

FIG. 4 is a top view of the wrist-worn wireless communication device 2 according to the present embodiment. FIG. 4 depicts a state with the display panel board 32 detached from the circuit board 24. On the circuit board 24 are disposed a high-frequency analog IC 36 provided with transmitting and receiving functions; circuit-board-side terminals 28; and wiring 52 connecting the high-frequency analog IC 36 to a circuit-board-side terminal 28. The high-frequency analog IC 36 transmits and receives high-frequency signals (RF signals) of 2.4 GHz, for example.

The circuit-board-side terminals 28 function as connecting terminals for the circuit board 24 and the display panel board 32, and also function as the antenna of the wrist-worn wireless communication device 2. As shall be apparent, the plurality of circuit-board-side terminals 28 is separated in order to transmit respectively different signals. Consequently, in unmodified form they cannot function as an antenna. Accordingly, the plurality of circuit-board-side terminals 28 is connected by small-capacity coupling capacitors 68. Specifically, they are connected in a high-frequency manner. Meanwhile, because the signals applied to the circuit-board-side terminals 28 are direct current signals or low-voltage signals, there is no risk of problems arising in relation to function, despite the terminals being coupled by the small-capacity coupling capacitors 68. Moreover, antenna length; i.e., frequency, can be adjusted through the number of coupling capacitors 68 which connect the plurality of circuit-board-side terminals 28.

Typically, the circuit-board-side terminals 28 are arranged in outside peripheral sections of the circuit board 24. These positions are close to free space and away from ICs such as a CPU, which is a source of noise. Consequently, where such a configuration is used for an antenna, antenna performance can be improved.

Figure 5:
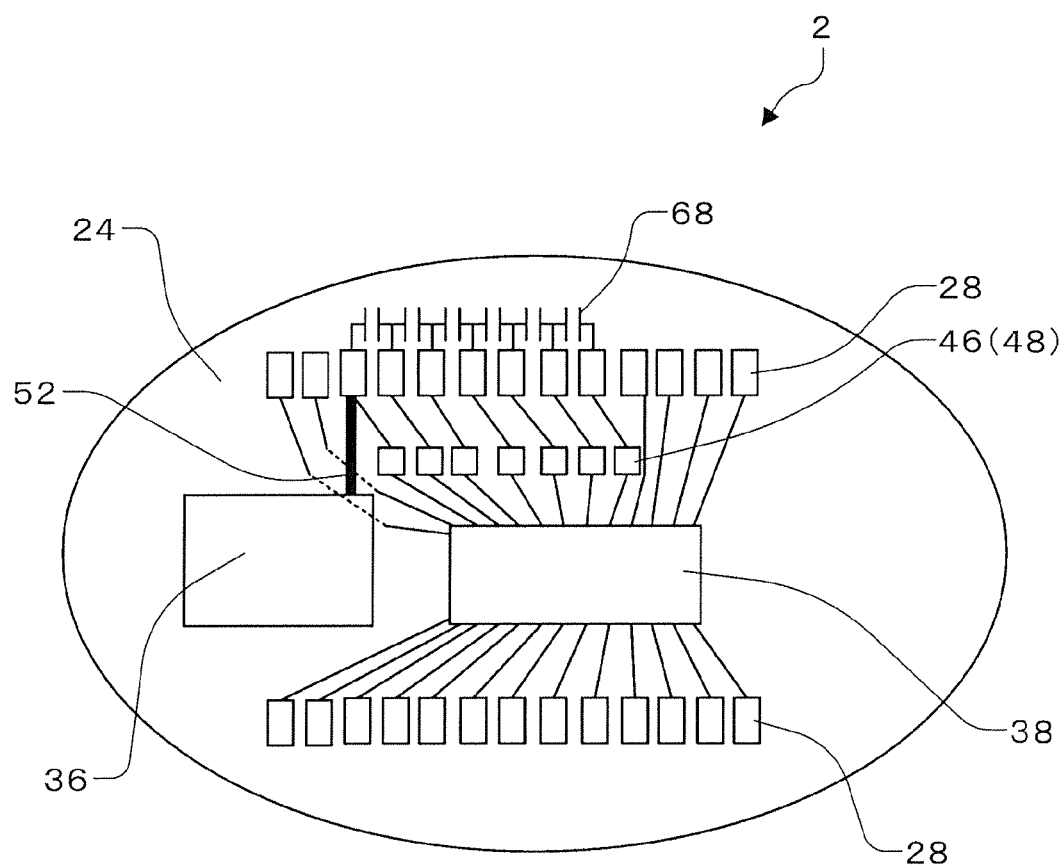
FIG. 5 is a top view of the wrist-worn wireless communication device according to the first embodiment.

FIG. 5 is a top view of the wrist-worn wireless communication device 2 according to the present embodiment. FIG. 5 depicts a state with the display panel board 32 detached from the circuit board 24. On the circuit board 24 is disposed a signal processing digital IC (second internal circuit) 38. The signal processing digital IC 38 incorporates digital circuitry for sampling a reception signal prior to analog/digital conversion, as well as phased-lock loop circuitry and the like.

In order to reliably prevent high-frequency signal leakage to the signal processing digital IC 38, in cases where, viewed from the high-frequency analog IC 36, impedance of the signal processing digital IC 38 on the circuit board 24 is low or lines are long, inductance elements 46 or resistance elements 48 may be interposed as second high-frequency cutoff elements between the signal processing digital IC 38 and the circuit-board-side terminals 28. The signals supplied to the signal processing digital IC 38 are direct current signals or low-frequency signals, and moreover the electrical current is very low, and accordingly there is substantially no risk of problems arising from interposition of the inductance elements 46 or resistance elements 48.

In the present embodiment, as there is a risk of high-frequency signal leakage to the display panel board 32 via the zebra connector, it is preferable for the zebra connector to have high resistance or be given inductance characteristics. In this case as well, the signals supplied to the liquid crystal panel 10 are direct current signals or low-frequency signals, and moreover the electrical current is very low, and accordingly there is substantially no risk of problems arising.

In the wrist-worn wireless communication device 2 according to the present embodiment, at least one space between contiguous terminals from among the plurality of circuit-board-side terminals 28 is used for an antenna, thereby obviating the need for an antenna element such as a chip antenna, as well as obviating the need for antenna connection unit, and making possible an instrument having smaller size and weight, and lower cost.

Second Embodiment

Figure 6A:
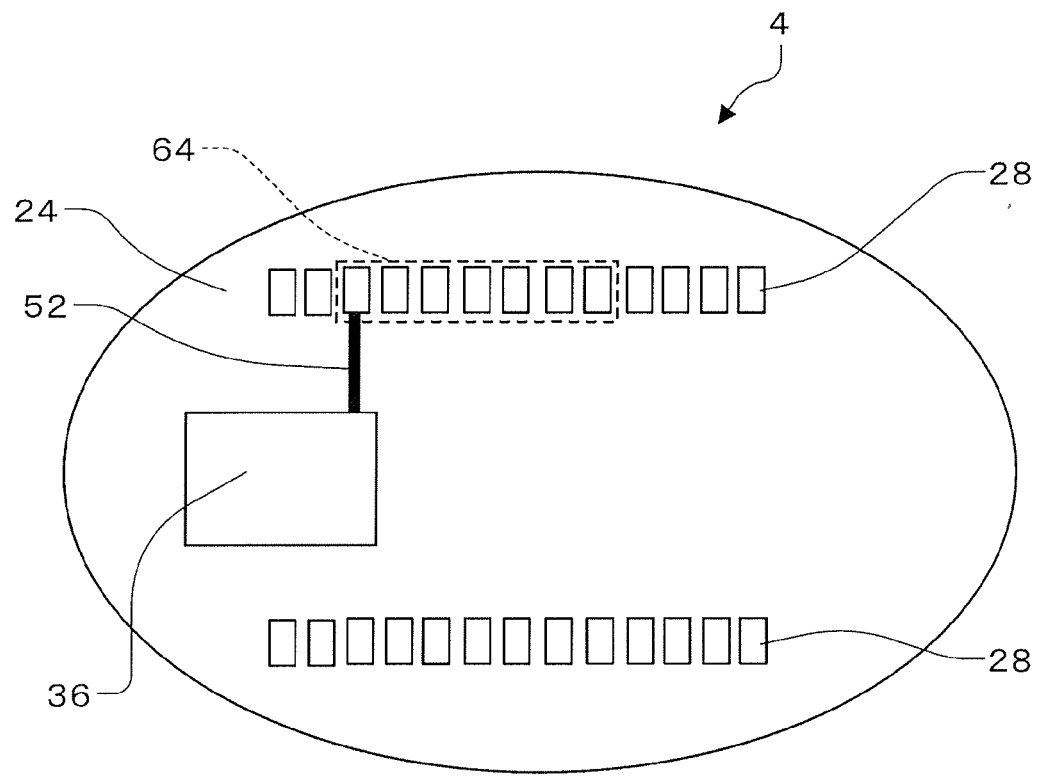
FIG. 6 is a top view and cross sectional view of a wrist-worn wireless communication device according to a second embodiment.
Figure 6B:
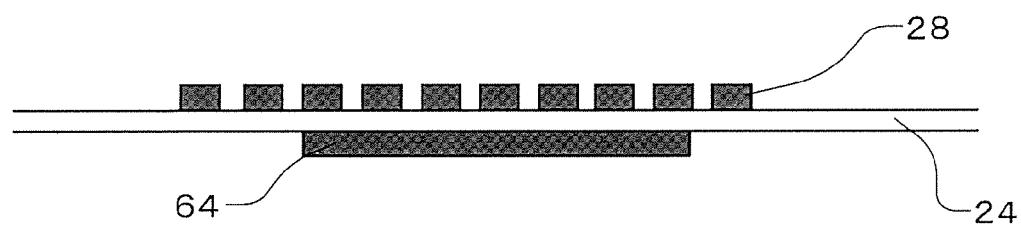
Figure 6C:
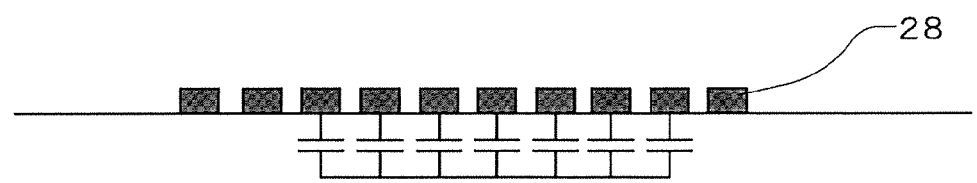

FIG. 6 is a top view and cross sectional view of a wrist-worn wireless communication device according to the present embodiment. FIG. 6A is a top view, FIG. 6B is a cross sectional view, and FIG. 6C is a diagram showing capacitive coupling. FIG. 6 depicts a state with the display panel board 32 detached from the circuit board 24. In the description of the present embodiment, configurations like those in the previously-described embodiment are assigned like symbols, and are not described.

As shown in FIG. 6A, in place of the coupling capacitors 68 of the previously-described wrist-worn wireless communication device 2, the wrist-worn wireless communication device 4 according to the present embodiment is furnished with a pattern (conductor) 64 on an outer layer (or an inner layer) of the circuit board 24 in a section thereof facing the circuit-board-side terminals 28. In so doing, by providing capacitive coupling among the circuit-board-side terminals 28 as depicted in FIG. 6C, the circuit-board-side terminals 28 can be made to function as an antenna.

Here, capacitive coupling will be described. The capacity of a planar capacitor is $C = \epsilon \times \epsilon_0 \times S/d$. Here, $\epsilon$ is relative permittivity, $\epsilon_0$ is permittivity of vacuum, S is surface area of the circuit-board-side terminals 28, and d is distance between the pattern 64 and the circuit-board-side terminals 28. Where a high-permittivity board is used as the circuit board 24, and $\epsilon$ is 30, S is 0.4 mm$^2$ (length 2 mm, width 0.2 mm), and d is 0.01 mm, capacity will be approximately 10.6 pF. In this case, the impedance of 2.4 GHz is $Z = 1/j\omega C$. Here, $\omega$ is angular frequency, and with approximately 6 ohms per capacitor, the circuit-board-side terminals 28 can be connected with sufficiently low impedance of approximately 12 ohms between them. The plurality of circuit-board-side terminals 28 is connected in a high-frequency manner by this capacity.

Meanwhile, because the signals applied to the circuit-board-side terminals 28 are direct current signals or low-frequency signals, there is no risk of problems arising from coupling by capacity of this order of magnitude. For example, where frequency is 1 MHz, impedance per capacitor is approximately 15 Mohm to give approximately 30 Mohm between the circuit-board-side terminals 28, which may be viewed as a substantially open circuit.

The antenna length, that is, the frequency, can be adjusted through the length of the pattern 64. For example, the wavelength in vacuum $\lambda$ of 2.4 GHz is 12.5 cm. The required length of a monopole antenna is $\lambda/4$, and is therefore 3.125 cm. Here, where a glass-epoxy board is used for example, assuming relative permittivity $\epsilon r$ of 4.7, antenna required length is $3.125/4.7^{1/2}$ or 1.44 cm. Or, where a ceramic board is used for example, assuming relative permittivity εr of 30, antenna required length is $3.125/30^{1/2}$ or 0.57 cm.

According to the present embodiment, there is no need for mounting of capacitors, and it is therefore possible to further reduce size, weight, and cost of the device.

Third Embodiment

Figure 7:
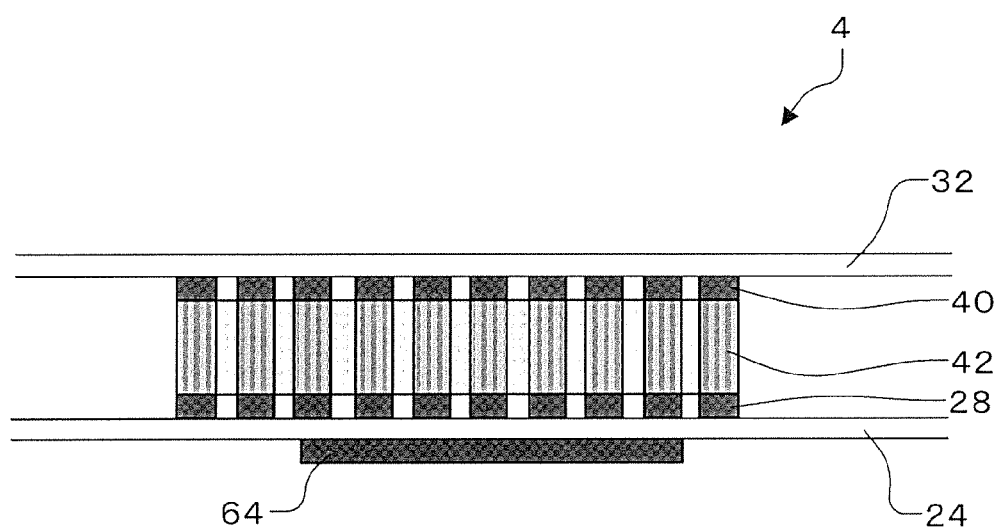
FIG. 7 is a cross sectional view of a wrist-worn wireless communication device according to a third embodiment.

FIG. 7 is a cross sectional view of a wrist-worn wireless communication device according to the present embodiment. In the description of the present embodiment, configurations like those in the previously-described embodiments are assigned like symbols, and are not described.

The wrist-worn wireless communication device 4 according to the present embodiment has disposed therein a zebra connector 42 for connecting the circuit-board-side terminals 28 on the circuit board 24 with the display panel-side terminals 40 on the display panel board 32. In the wrist-worn wireless communication device 4, in addition to the arrangements taught in the second embodiment, the zebra connector 42 is itself used to function as an antenna. Typically, the zebra connector 42 is arranged in an outside peripheral section of the circuit board 24. This position is close to free space and away from ICs such as a CPU, which is a source of noise. Consequently, antenna performance can be further improved in cases where the zebra connector 42 is used in manner such as to function as an antenna. Moreover, antenna performance improves owing to increased cubic volume of the conductor used to function as an antenna, due to the zebra connector 42. In this case, it is preferable for the zebra connector 42 to have low resistance.

Figure 8:
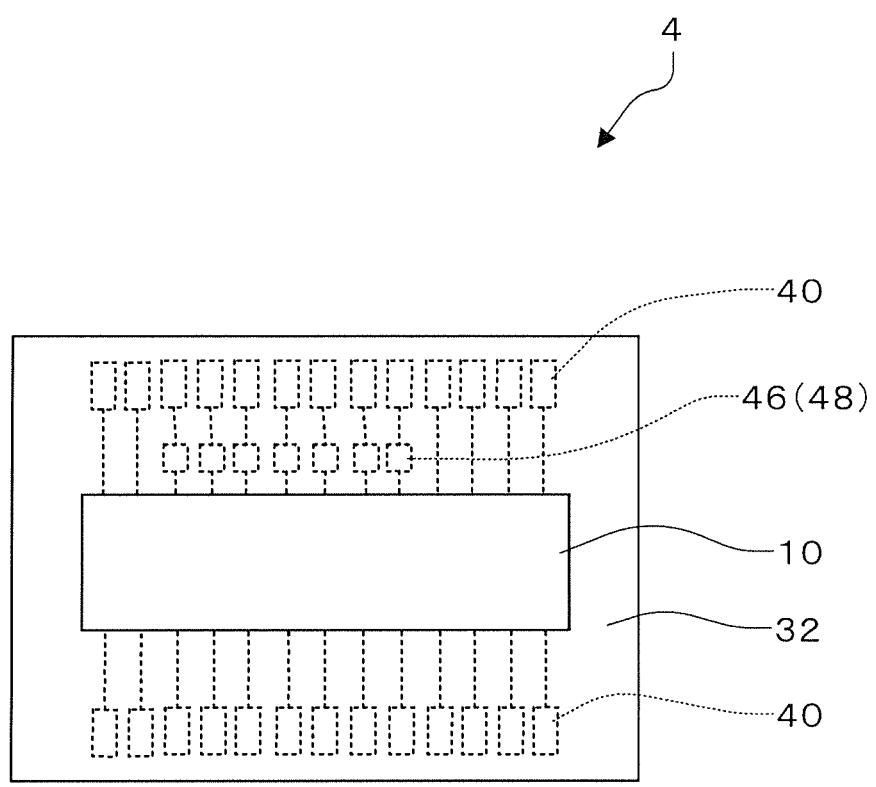
FIG. 8 is a top view of the wrist-worn wireless communication device according to the third embodiment.

FIG. 8 is a top view of the wrist-worn wireless communication device 4 according to the present embodiment. In order to reliably prevent high-frequency signal leakage to the liquid crystal display panel 10, in cases where, viewed from the high-frequency analog IC 36 (see FIG. 6A), impedance of the liquid crystal display panel 10 on the display panel board 32 is low or lines are long, inductance elements 46 or resistance elements 48 may be interposed as first high-frequency cutoff elements between the liquid crystal display panel 10 and the display panel-side terminals 40. The signals supplied to the liquid crystal display panel 10 are direct current signals or low-frequency signals, and moreover the electrical current is very low, and accordingly there is substantially no risk of problems arising from interposition of the inductance elements 46 or resistance elements 48.

Fourth Embodiment

Figure 9:
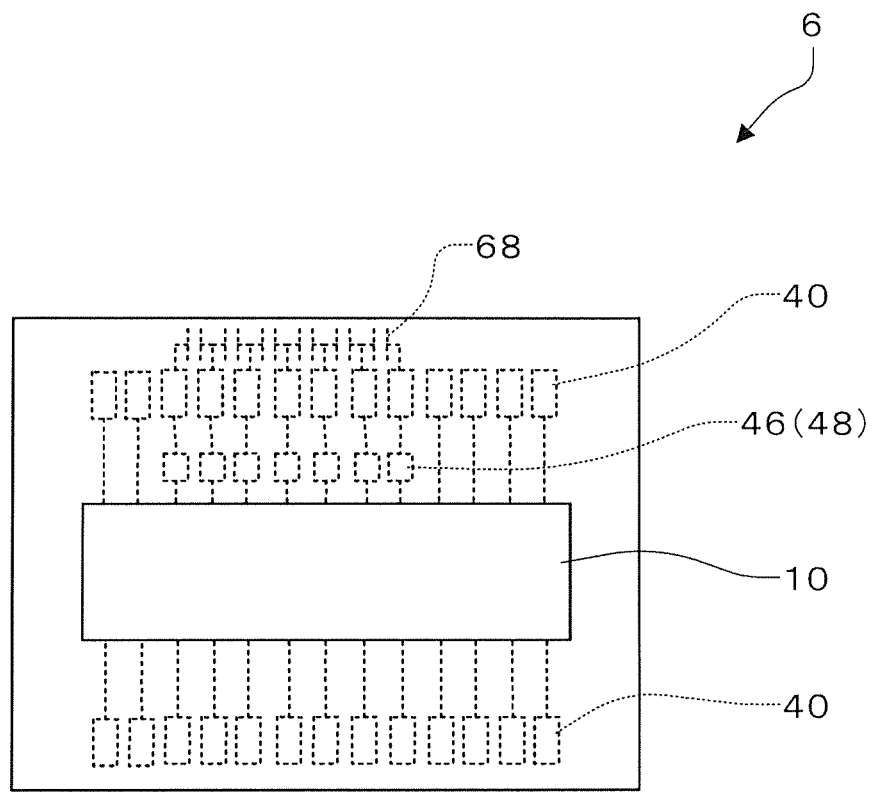
FIG. 9 is a top view of a wrist-worn wireless communication device according to a fourth embodiment.

FIG. 9 is a top view of a wrist-worn wireless communication device according to the present embodiment. In the description of the present embodiment, configurations like those in the previously-described embodiments are assigned like symbols, and are not described.

In addition to the arrangements of the wrist-worn wireless communication device 4 discussed previously, the wrist-worn wireless communication device 6 according to the present embodiment has coupling capacitors 68 mounted between the display panel-side terminals 40 of the display panel board 32. In so doing, the wrist-worn wireless communication device 6 has double the capacity of the coupling capacitors than in the wrist-worn wireless communication device 4 discussed previously. Consequently, when this configuration is used to function as an antenna, antenna performance can be further improved.

Fifth Embodiment

Figure 10A:
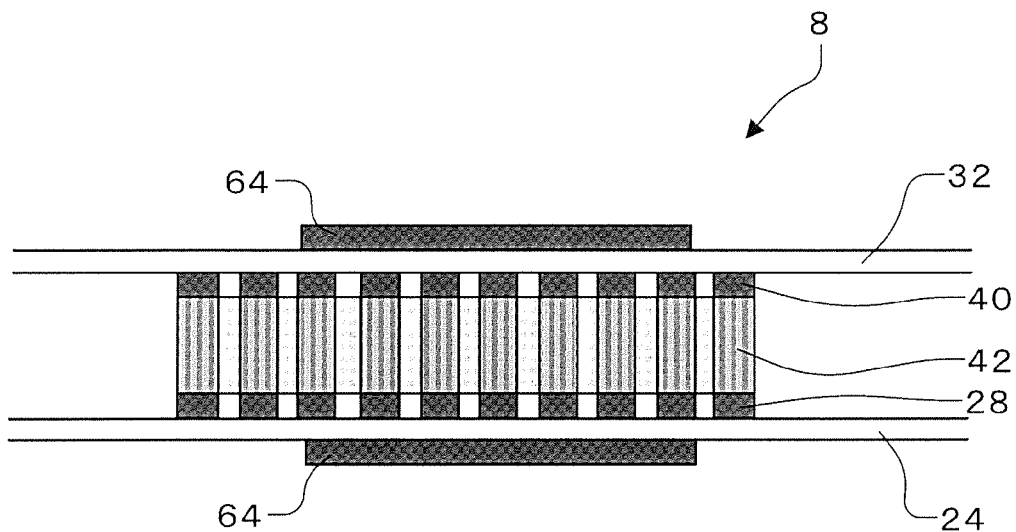
FIG. 10 is a cross sectional view of a wrist-worn wireless communication device according to a fifth embodiment.
Figure 10B:
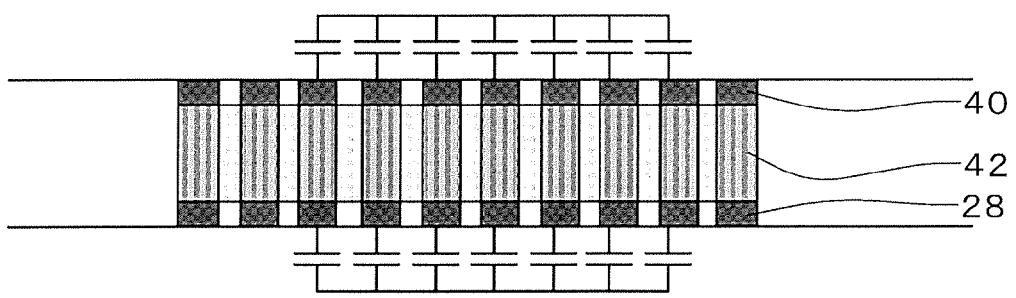

FIG. 10 is a cross sectional view of a wrist-worn wireless communication device according to the present embodiment. FIG. 10B is a diagram showing capacitive coupling. In the description of the present embodiment, configurations like those in the previously-described embodiments are assigned like symbols, and are not described.

As shown in FIG. 10A, in place of the coupling capacitors 68 of the wrist-worn wireless communication device 6 discussed previously, the wrist-worn wireless communication device 8 according to the present embodiment is furnished with a pattern (conductor) 64 on an outer layer (or an inner layer) of the display panel board 32 in a section thereof facing the display panel-side terminals 40. In so doing, by providing capacitive coupling among the display panel-side terminals 40 as depicted in FIG. 10B, the display panel-side terminals 40 can be made to function as an antenna.

According to the present embodiment, there is no need for mounting of capacitors, and it is therefore possible to further reduce size, weight, and cost of the device.

Sixth Embodiment

Figure 11:
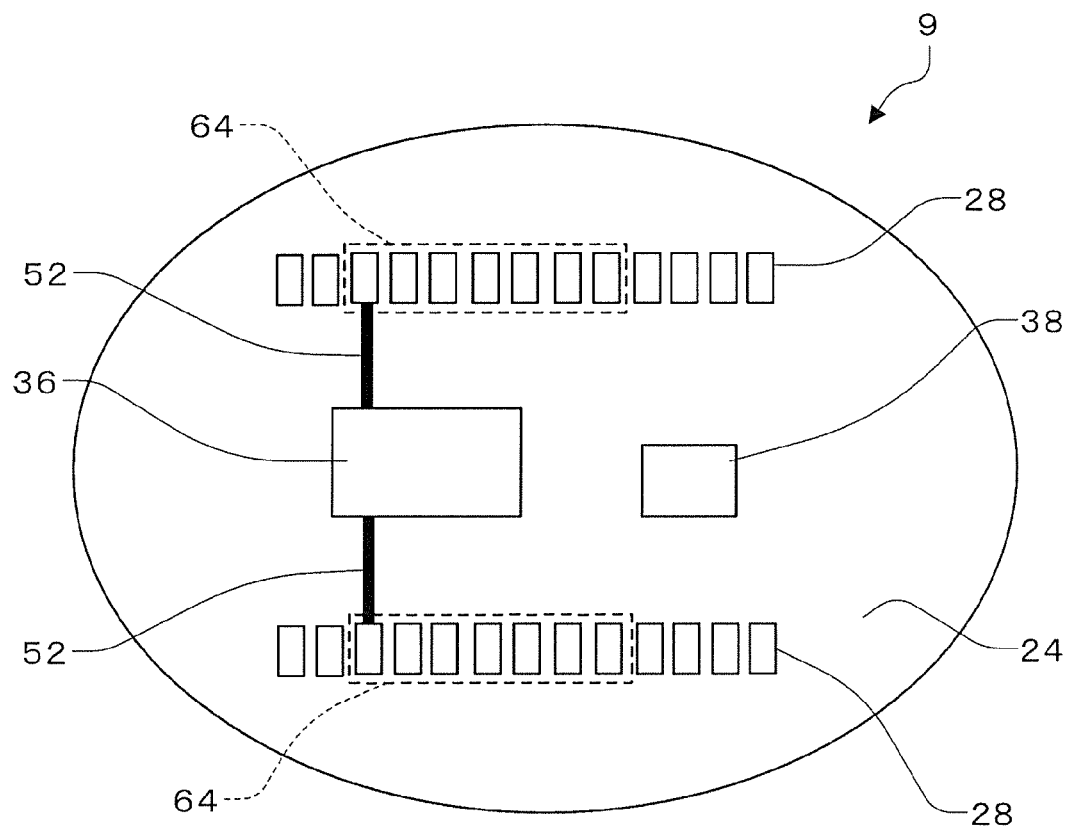
FIG. 11 is a top view of a wrist-worn wireless communication device according to a sixth embodiment.

FIG. 11 is a top view of a wrist-worn wireless communication device according to the present embodiment. In the description of the present embodiment, configurations like those in the previously-described embodiments are assigned like symbols, and are not described.

Typically, connections between the circuit board 24 and the display panel board 32 are carried out in pairs at top and bottom or at left and right. In the wrist-worn wireless communication device 9 according to the present embodiment, the respective circuit-board-side terminals 28 are used to function as an antenna. As shall be apparent, implementation in the first to fifth embodiments is possible as well.

Seventh Embodiment

Figure 12:
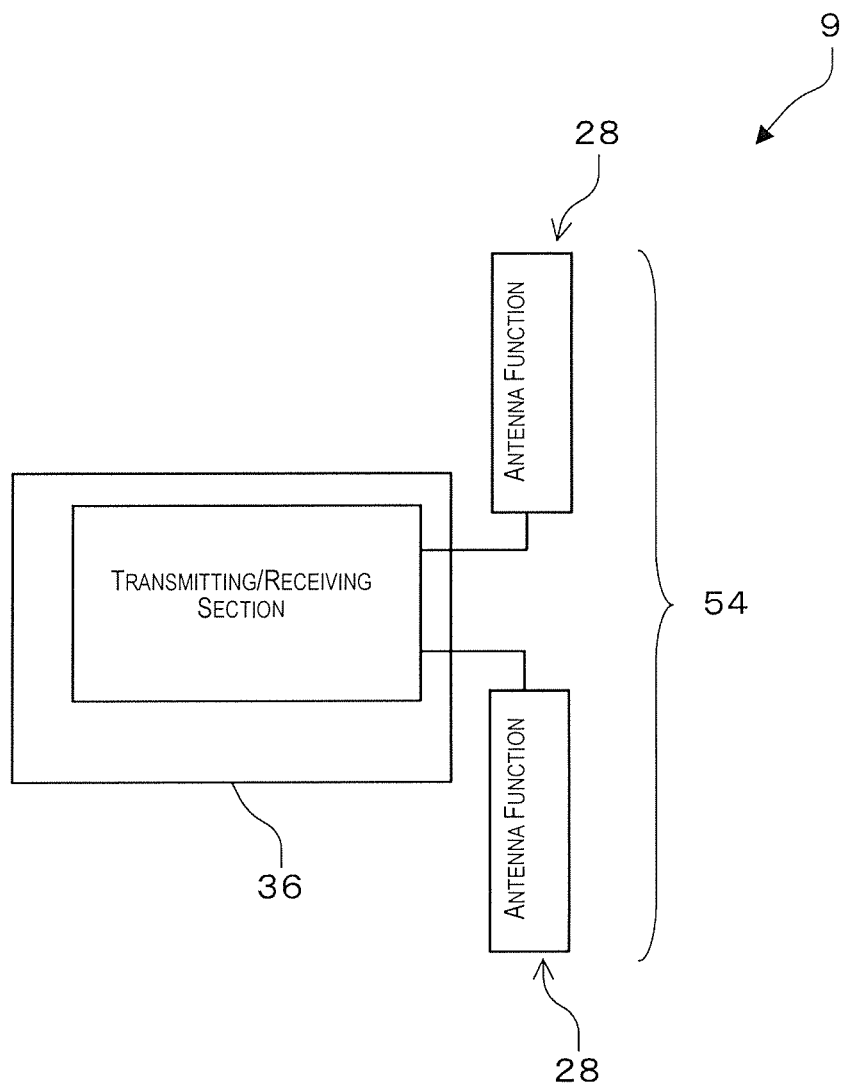
FIG. 12 is a diagram showing a configuration of an antenna according to a seventh embodiment.

FIG. 12 is a diagram showing a configuration of an antenna according to the present embodiment. In the description of the present embodiment, configurations like those in the previously-described embodiments are assigned like symbols, and are not described.

As shown in FIG. 12, the wrist-worn wireless communication device 9 according to the present embodiment is configured such that circuit-board-side terminals 28 at two locations function as a dipole antenna 54. In so doing, there is afforded a high-performance antenna whereby transmission efficiency and receiving sensitivity are improved. With a monopole antenna, GND of large surface area is necessary to attain such performance, and this is difficult to adequately ensure in a compact wireless communication device such as a wrist-worn wireless communication device. A dipole antenna, on the other hand, substantially requires no GND, and is therefore suited for a compact wireless communication device such as a wrist-worn wireless communication device.

Eighth Embodiment

Figure 13:
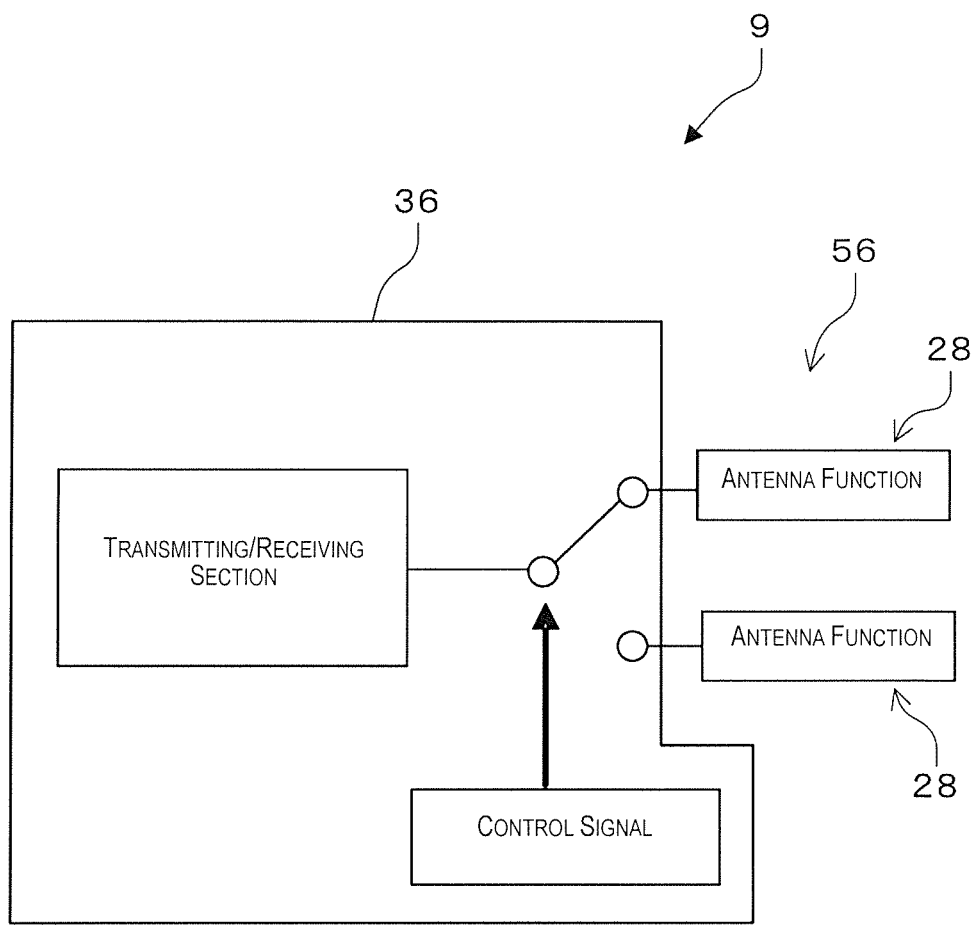
FIG. 13 is a diagram showing a configuration of an antenna according to an eighth embodiment.

FIG. 13 is a diagram showing a configuration of an antenna according to the present embodiment. In the description of the present embodiment, configurations like those in the previously-described embodiments are assigned like symbols, and are not described.

As shown in FIG. 13, the wrist-worn wireless communication device 9 according to the present embodiment is configured such that circuit-board-side terminals 28 at two locations function as a diversity antenna 56. In so doing, signals may be input by two radio reception routes, and therefore the antenna function having better reception status can be selected, therefore affording a high-performance antenna whereby transmission efficiency and receiving sensitivity are improved.

Apart from the wrist-worn wireless communication device as shown above, other wireless communication devices that can utilize the present embodiment include pagers (mobile compact wireless paging devices), telephones, televisions, Global Positioning System (GPS) or other satellite receivers, wireless LANs, and other devices using high-frequency circuits and antenna elements in a limited space.

What is claimed is:

1. A wireless communication device including:
    a first circuit board on which a plurality of first terminal sections is arranged;
    a high-frequency circuit arranged on the first circuit board and connected to at least one of the plurality of first terminal sections;
    a second circuit board on which is arranged a plurality of second terminal sections facing the plurality of first terminal sections;
    a first internal circuit arranged on the second circuit board and connected to at least one of the plurality of second terminal sections; and
    electrical continuity unit providing electrical continuity among the plurality of first terminal sections and the plurality of second terminal sections; wherein
    at least two contiguous terminals from among the plurality of first terminal sections and/or the plurality of second terminal sections including a terminal that is connected to the high-frequency circuit are connected via a capacitor; and
    the two contiguous terminals connected via the capacitor function as an antenna for wireless communication.

2. The wireless communication device according to claim 1, wherein
    at least part of the electrical continuity unit functions as an antenna for wireless communication.

3. The wireless communication device according to claim 1, wherein
    the plurality of first terminal sections is arranged in outside peripheral sections of the first circuit board.

4. The wireless communication device according to claim 3, wherein
    the antenna is a dipole antenna.

5. The wireless communication device according to claim 3, wherein
    the antenna is a diversity antenna.

6. The wireless communication device according to claim 1, wherein
    the wireless communication device includes a second internal circuit arranged on the first circuit board, connected to at least one of the plurality of first terminal sections, and adapted to output a direct current signal or a low-frequency signal; and
    further includes
    first high-frequency cutoff elements connected at a first end to the second terminal sections and at another end to the first internal circuit; and/or
    second high-frequency cutoff elements connected at a first end to the first terminal sections and at another end to the second internal circuit.

7. The wireless communication device according to claim 6, wherein the first and second high-frequency cutoff elements are inductance elements.

8. The wireless communication device according to claim 6, wherein the first and second high-frequency cutoff elements are resistance elements.

9. The wireless communication device according to claim 1, wherein the first internal circuit is a display section; and the second internal circuit is a digital IC for signal processing.

* * * * *